United States Patent [19]
Piret

[11] 3,799,000
[45] Mar. 26, 1974

[54] TRANSMISSION WITH GEARBOX OUTPUT SHAFT AND DIFFERENTIAL INPUT SHAFT IN DIFFERENT VERTICAL PLANES

[75] Inventor: Jean Piret, Bougival, France

[73] Assignees: Automobiles Peugeot, Paris; Regie Nationale Des Usines Renault, Boulogne-Billancourt, both of, France

[22] Filed: Feb. 1, 1972

[21] Appl. No.: 222,552

[30] Foreign Application Priority Data
Mar. 10, 1971 France .............................. 71.08266

[52] U.S. Cl. .................................... 74/694, 74/700
[51] Int. Cl. ............................................ F16h 37/08
[58] Field of Search ...................... 74/695, 700, 694

[56] References Cited
UNITED STATES PATENTS

| | | | |
|---|---|---|---|
| 1,446,545 | 2/1923 | Brush et al. ......................... | 74/713 X |
| 3,095,764 | 7/1963 | Peras .................................... | 74/763 |
| 3,122,944 | 3/1964 | Boehner et al. ..................... | 74/700 |
| 3,132,536 | 5/1964 | Sampietro........................... | 74/700 |
| 3,150,543 | 9/1964 | Dangauthier........................ | 74/700 |
| 3,474,690 | 10/1969 | Lepelletier......................... | 74/695 X |
| 3,614,902 | 10/1971 | Candellero........................... | 74/695 |
| 3,703,107 | 11/1972 | Piret..................................... | 74/695 |

FOREIGN PATENTS OR APPLICATIONS

| | | | |
|---|---|---|---|
| 1,177,949 | 9/1964 | Germany ............................. | 74/695 |
| 911,055 | 11/1962 | Great Britain........................ | 74/695 |

*Primary Examiner*—Benjamin W. Wyche
*Assistant Examiner*—J. Reep
*Attorney, Agent, or Firm*—Burns, Doane, Swecker & Mathis

[57] ABSTRACT

Transmission device, in particular for an automobile vehicle, having a gearbox and a differential mechanism. The output shaft of the gearbox and a second shaft, driven by the output shaft and carrying the drive pinion of the differential crown wheel, are contained in two different vertical planes.

A specific arrangement is described in which the output shaft of the gearbox and the second shaft are contained in a plane making an angle of substantially 55° with the vertical.

4 Claims, 5 Drawing Figures

TRANSMISSION WITH GEARBOX OUTPUT SHAFT AND DIFFERENTIAL INPUT SHAFT IN DIFFERENT VERTICAL PLANES

The present invention relates to transmission units employed for example in automobile vehicles.

One of the main problems in this field is the difficulty of constructing transmission devices which are small and can be easily placed in vehicles of different type and design and yet are compatible with mass-production and a thorough standardization. In particular, it is important to be able to employ complete sub-assemblies, such as that consisting of a differential mechanism and the drive shafts for the driving wheels, with different gearboxes.

With this general problem in mind, an object of the present invention is more particularly to provide a transmission device having a gearbox and differential and in which are imposed in particular the construction of the differential mechanism and of the wheel shafts and, for reasons of location, the vertical distance between the axis of the output shaft of the gearbox and the axis of the differential mechanism, which is defined as being the axis common to the crown wheel and the axis of rotation of the planet gear carrier.

This problem is solved in the device according to the invention owing to the following feature : the output shaft of the gearbox and the shaft which carries the driving pinion of the differential crown wheel and is driven by said output shaft have their axes in two different vertical planes. When the axes of these two shafts are parallel, the plane which contains them is therefore oblique and its inclination can be determined in accordance with the imposed vertical distance between these two axes.

A second problem is added to this first problem in the special case where the transmission device comprises a hydrokinetic torque converter or coupling and an automatically-controlled gearbox. A conventional arrangement for an automatic gearbox consists in disposing the converter at the end of the transmission line which is adjacent the engine, concentrically disposing the input and output shafts of the gearbox and placing the differential under the converter-gearbox assembly and between these two parts of the transmission. The gearbox having a hydraulic control mechanism is provided with a separate pump which supplies it with hydraulic fluid. This pump is usually placed at the end of the gearbox remote from the converter, so that the shaft which drives it is mounted inside the gearbox input shaft which is placed inside the output shaft. This arrangement has numerous drawbacks the main one of which is the increased axial size, since the pump is mounted at the end of the gearbox, and also increased radial size, since the shaft connecting the turbine of the converter to the gearbox is hollow and must have an increased diameter to be capable of transmitting the desired torque without risk of fracture. Another solution, consisting in interposing the supply pump of the gearbox between the converter and the differential case, results in an increase in the horizontal distance between the assembly plane of the cases of the engine and the converter and the axis of the differential and can therefore only be adopted when considerations of size and location are considered as relatively secondary.

According to the invention, the respective positions of the hydraulic converter, the gearbox and the differential are maintained and the pump which supplies the hydraulic fluid to the gearbox is disposed in the immediate vicinity of the converter, between the latter and the differential mechanism, but the teeth of the crown wheel of the differential mechanism is on the opposite side of the crown wheel to the differential mechanism.

In this way there is obtained, in combination with the aforementioned features, a particularly compact transmission unit of minimum overall size.

Further features and advantages of the invention will be apparent from the ensuing description with reference to the accompanying drawings.

There will first be described with reference to FIGS. 1 and 2 an improvement according to the invention in transmission devices in particular for automobile vehicles.

Figure 1:
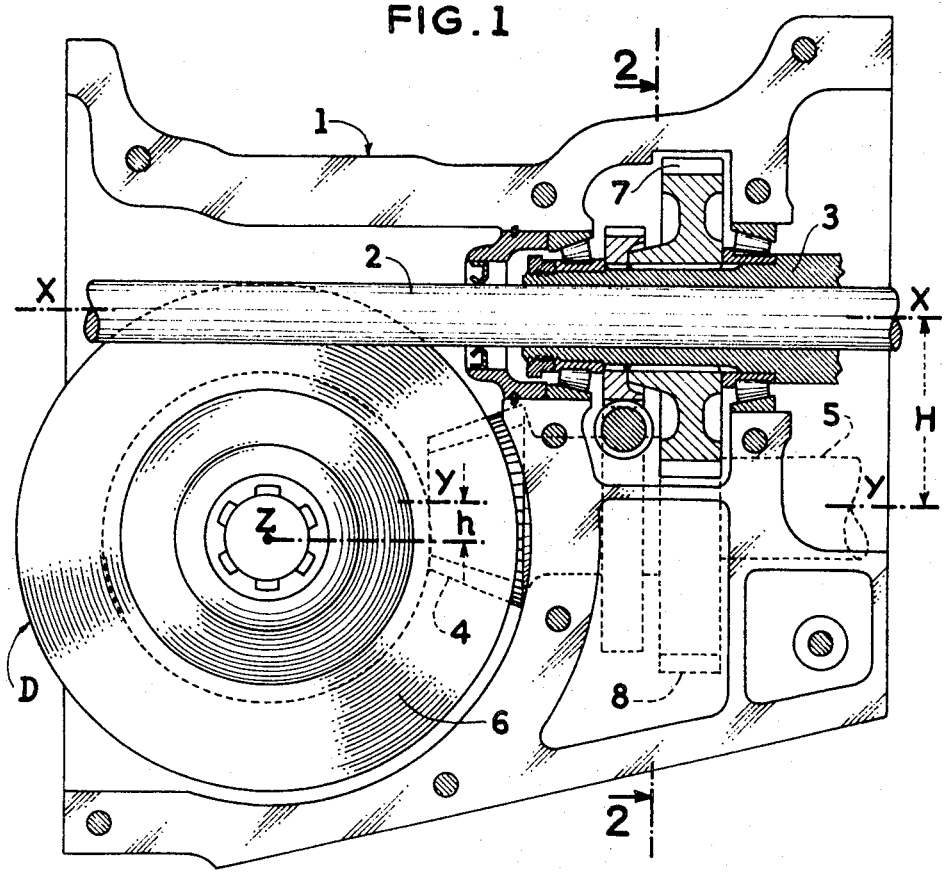
FIG. 1 is a sectional view of a part of a transmission device according to the invention.
Figure 2:
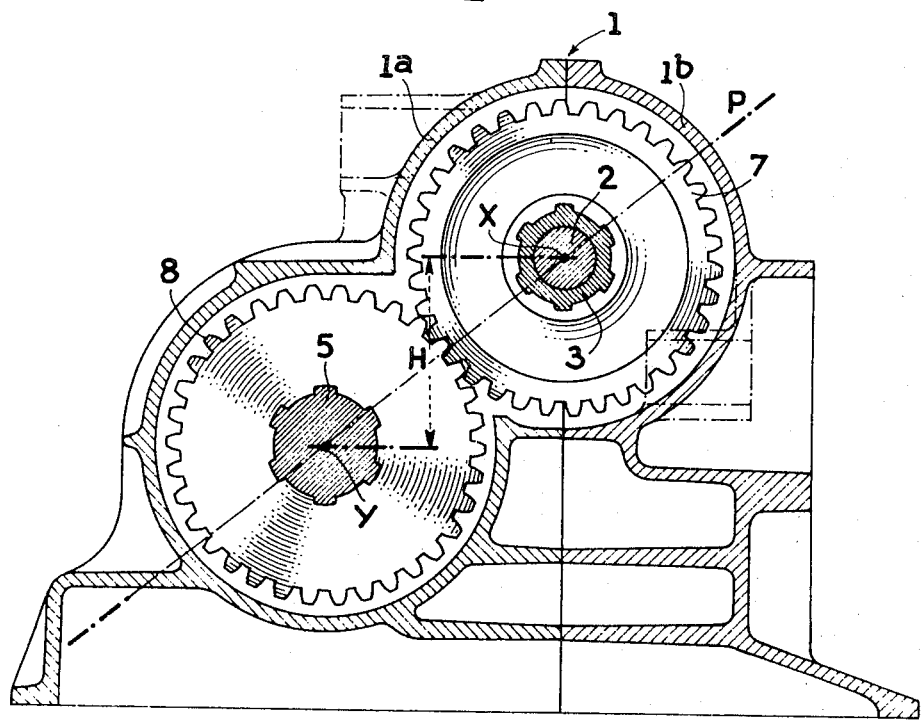
FIG. 2 is a sectional view taken on line 2—2 of FIG. 1.

FIGS. 1 and 2 show an input shaft 2 having an axis X-X of a gearbox (not shown) received in a casing 1 in two parts $1^a$, $1^b$, the output shaft 3 of the gearbox which is concentric to the shaft 2, and the differential mechanism D whose driving pinion 4 is carried by a shaft 5 having an axis Y-Y parallel to the axis X-X and whose crown wheel 6 and sun wheels (not shown) have an axis Z-Z perpendicular to the axes X-X and Y-Y. The axis Z-Z constitutes the axis of the differential mechanism.

According to the invention and as can be seen better in FIG. 2, the axes X-X and Y-Y are parallel to each other but not contained in the same vertical plane, so that the plane P which contains these axes is oblique, its inclination being in the neighbourhood of 55° in the presently-described embodiment. The output shaft 3 of the gearbox carries a lowering gear 7 which meshes with another gear 8 integral with the layshaft or intermediate shaft 5 which carries at its other end the pinion 4 driving the differential mechanism.

It will be observed that the vertical distance H between the axes X-X and Y-Y of the output shaft of the transmission and the driving pinion of the differential mechanism is substantially less than the distance between the two axes in the plane P. The vertical size of the transmission device is consequently reduced. Moreover, the axis Y-Y can be a distance $h$ above the axis Z-Z which imparts to the differential mechanism D satisfactory hypoid features so that a relatively smaller diameter can be given to the differential crown wheel for a given transmitted torque. On the other hand, if the axes X-X and Y-Y were in the same vertical plane, as is usually the case, the vertical distance H between the axes would be substantially greater and the offset of the differential would be negative and would result in an increase in the diameter of the crown wheel.

Figure 3:
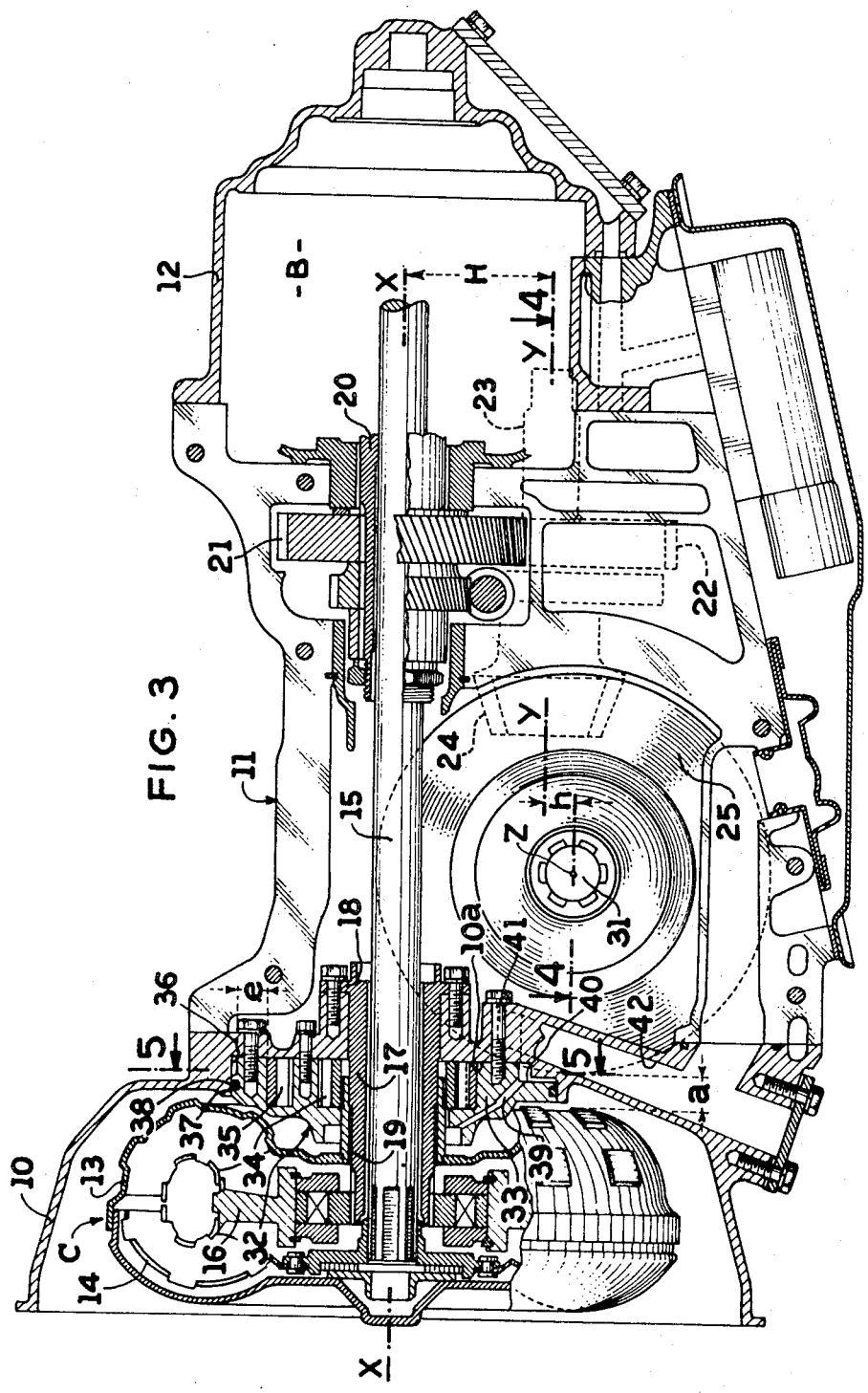
FIG. 3 is a vertical longitudinal sectional view of a transmission according to the invention.

A more precise and fuller description of the transmission device according to the invention will be made with reference to FIGS. 3 and 4 which show a transmission comprising a hydrokinetic converter C, a gearbox B and a differential mechanism D. In accordance with a conventional arrangement, the converter is located at one end of the transmission line, in the vicinity of the engine (not shown) and the gearbox is disposed at the opposite end of this transmission line, the differential being placed between the converter and the gearbox at a substantially lower level. The assembly is disposed in a converter casing 10, an intermediate casing 11 and a gearbox casing 12, these casings being of course shaped and assembled in any suitable manner.

Also in accordance with a conventional arrangement, the converter comprises a pump element or impeller 13 driven by the crankshaft of the engine (not shown), a turbine 14 connected to rotate with a shaft 15 which extends through the intermediate casing and constitutes the input shaft of the gearbox, a reactor 16 connected by splining to a reaction shaft 17 which is fixed by a flange 18 to the wall 10$^a$ of the converter casing. The impeller 13 of the converter is rotatably mounted on the reaction shaft 17 through a smooth bearing 19.

The gearbox mechanism, which can be an automatically-controlled gearbox, has not been shown in detail since its construction is not determinant in the description of the operation of the invention. Note that the output element of the gearbox is constituted by a hollow shaft 20 which is disposed around the input shaft 15 and can be, for example, integral with the planet gear carrier or with the crown wheel of a planetary gearset which is part of the mechanism of the gearbox. As in the embodiment shown in FIG. 1, the output shaft 20 carries a lowering gear 21 which meshes with a second gear 22 integral with an intermediate or layshaft 23 which also carries a pinion 24 driving the differential. The axis X-X of the converter and gearbox and the axis Y-Y of the differential driving pinion 24 are offset as shown in FIG. 2 and the plane containing them may make an angle of about 55° with the vertical.

Figure 4:
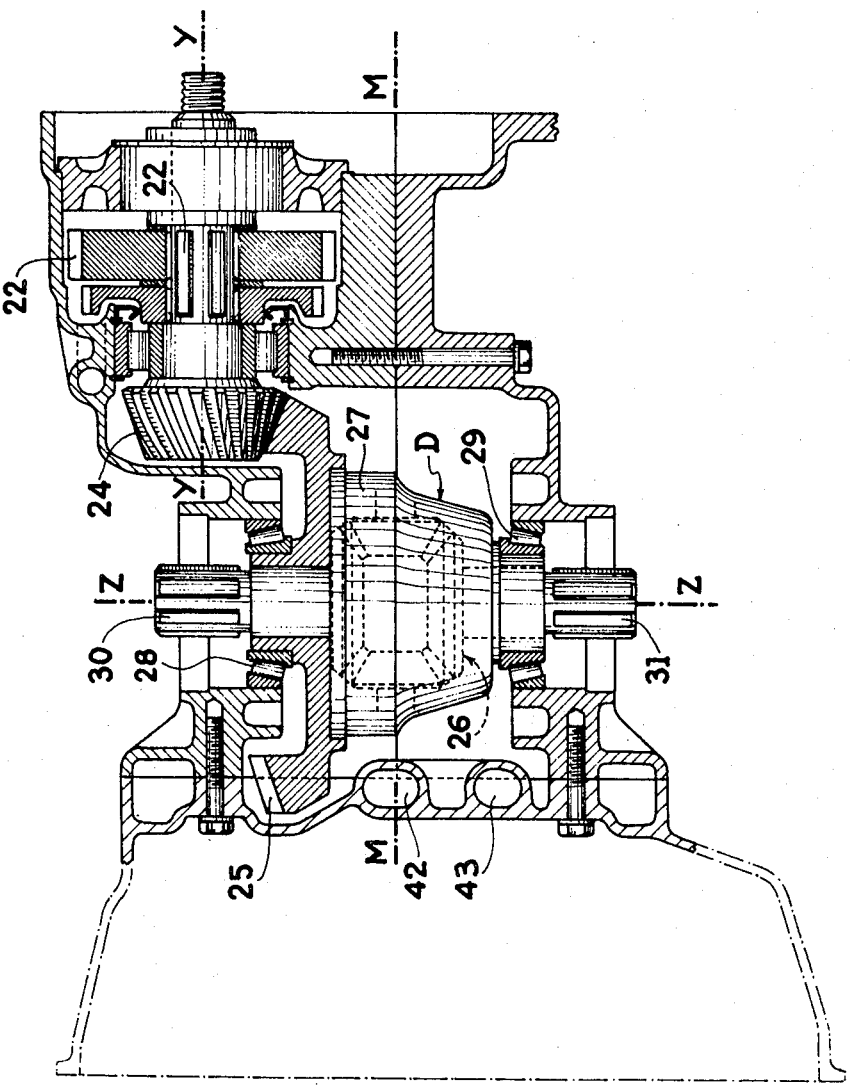
FIG. 4 is a partial sectional view taken on line 4—4 of FIG. 3.

As can be seen in FIG. 4, the crown wheel 25 of the differential has its teeth on the opposite side of the crown wheel to the differential mechanism proper or gearset 26. The crown wheel 25 and the case 27 of the differential mechanism which case carries the planet gears of the differential gearset are rotatably mounted by means of two rolling bearings 28 and 29, the bearing 28 being inside the crown wheel roughly in alignment with the driving pinion 24. The two drive shaft sections 30, 31 have the same length and are disposed symmetrically relative to the median plane M of the vehicle so as to enable identical universal joints and wheel drive shafts to be employed.

Figure 5:
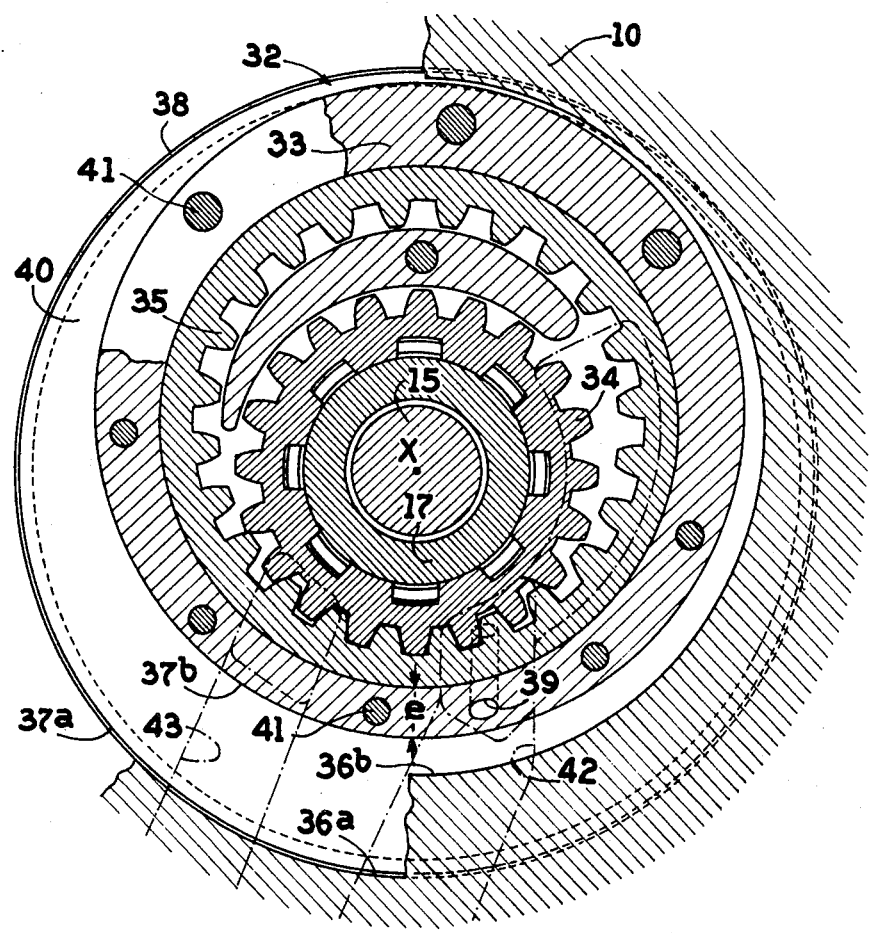
FIG. 5 is a partial sectional view taken on line 5—5 of FIG. 3.

The pump 32 which supplies the gearbox with hydraulic fluid under pressure is disposed between the converter and the differential mechanism. This pump (FIGS. 3 and 5) comprises a body 33 in which is disposed a gear 34, driven in rotation by the impeller of the converter, and a ring gear 35 which has internal teeth and is eccentric and meshed with the gear 34. The body 33 is received in a stepped housing or recess 36 formed in the end wall 10$^a$ of the converter casing. The recess 36 consists of two bores 36$^a$, 36$^b$ which are eccentric with respect to each other and receive two corresponding parts 37$^a$ and 37$^b$ of the pump body. The part 37$^a$ of larger diameter, which is centered on the axis X-X, centers the pump body in the bore 36$^a$. A toric sealing element 38 affords an outer seal of the pump and a drain 39 is provided for decompressing the seal. The part 37$^b$ of smaller diameter is located in the bore 36$^a$ with clearance and its end face 40 bears against the end face of the housing 36 and affords the inner seal of the pump, that is, the separation between the inlet and outlet parts. It will be observed that the bearing face 40 of the pump body is eccentric with respect to the pinion and the ring gear of the pump and its minimum radial thickness e shown in FIG. 6 is however sufficient to allow the passage of fixing screws 41. Inlet and outlet passages 42 and 43 are provided in the converter casing and in the pump body in the conventional manner.

Without going into details of the operation of such a transmission device having a hydrokinetic converter, automatically-controlled gearbox and differential, there will merely be mentioned the main advantages afforded by the novel features of the invention.

First, as already explained with reference to FIGS. 1 and 2, the offset position of the axis Y-Y of the intermediate shaft or layshaft carrying the driving pinion of the differential mechanism reduces the vertical size of the assembly and results in this axis Y-Y of the driving pinion being located at a height h above the axis Z-Z of the differential mechanism. This permits retaining a positive offset or hypoiding and employing a relatively smaller diameter for the crown wheel for a given transmitted torque.

The unusual position and orientation of this differential crown wheel also affords several interesting results : thus, the differential mechanism may in particular be placed in the longitudinal plane of symmetry of the vehicle so that it is possible to employ with such a mechanism two drive shafts of equal lengths. In this respect, it should be mentioned that the location of the rolling bearings 28 and 29, and in particular the location of the rolling bearing which is adjacent the crown wheel, is particularly advantageous since conventional universal joints may be employed and the drawbacks as concerns size and cost pertaining to devices in which these joints are incorporated in the differential avoided. The thrust exerted by the crown wheel along the axis Z-Z of the differential mechanism is in the direction from the bearing 28 to the bearing 29 (FIG. 4). As the latter is lightly loaded radially, it easily withstands this axial thrust. Bearing in mind that for production reasons the rolling bearings are chosen identical, they may be chosen with smaller dimensions than in conventional arrangements in which these bearings must be made oversize since the forces involved are less well distributed. As the crown wheel has its teeth on the opposite side of the wheel to the differential mechanism proper, a free space is available for receiving the pump 32.

The position of the pump 32 within the wall of the casing which separates the converter part from the differential part permits avoiding an additional drive shaft between the impeller of the converter and the opposite end of the gearbox D where this pump is usually disposed. As the crown wheel is offset (FIG. 4), the pump can be placed between the differential mechanism and the converter without substantially affecting the axial size. The dimensions a between the differential crown wheel and the converter would be practically the same if the pump was mounted at the opposite end of the gearbox.

The utilization of the reaction shaft fixed directly to the end of the converter casing and whose overhanging part is supported and centered by the pump element of the converter is also of great interest since it permits substantially reducing the number of necessary parts compared to the arrangements usually employed.

The particular mounting of the pump body in a cavity consisting of two eccentric bores is also of interest, since by reducing to a minimum value the bearing face 40 affording the internal seal a passage is provided for the differential crown wheel practically without increasing the axial size in this region, as mentioned hereinbefore. Further, the mounting guarantees an excellent seal between the pump and the differential mechanism which avoids any risk of leakage should an oil different from the gearbox oil be employed for lubricating the differential mechanism.

As can be seen, all these features : inclination of the plane P, offsetting of the differential crown wheel, construction and mounting of the pump 32, tend to afford the same result, that is, to provide a transmission device which is particularly compact and whose overall size in all directions is reduced to a minimum. Further, such an arrangement permits employing in various types of vehicles standardized sub-assemblies and in particular a sub-assembly consisting of the differential mechanism and two drive shafts of equal lengths, it being possible to employ a gearbox part of any suitable type, for example a mechanical or automatically-or semi-automatically-controlled gearbox.

Having now described my invention what I claim as new and desire to secure by Letters Patent is :

1. A transmission device, in particular for an automobile vehicle, comprising a hydrokinetic torque converter located adjacent a first end of the transmission device and having an impeller and an output shaft, an automatically-controlled gearbox located adjacent a second end opposed to said first end of the transmission device and having an output shaft and an input shaft which is coaxial with the output shaft of the gearbox and integral with the output shaft of the converter, a pump connected to be driven by the impeller for supplying fluid under pressure to the gearbox, and a differential mechanism placed between the converter and the gearbox at a lower level than the converter and gearbox and having a first part which includes a planet gear carrier of the differential mechanism and two output shafts which are contained in a first vertical plane perpendicular to the output shaft of the gearbox and are capable of being driven in a differential manner through the planet gear carrier and the differential mechanism having a second part which comprises a crown wheel integral with the planet gear carrier and having gear teeth and a pinion drivingly meshed with the crown wheel gear teeth and a second shaft integral with the pinion and connected to be driven by the output shaft of the gearbox, the output shaft of the gearbox and the second shaft having parallel axes of rotation contained in a plane making an angle of substantially 55° with the vertical, the crown wheel having said gear teeth on an opposite side of the crown wheel to said first part of the differential mechanism, the converter having a casing and the differential mechanism having a casing, a partition wall separating said casings and having a recess, the pump being placed between the converter and the differential mechanism in said recess, said first part having a centre lying substantially in a second vertical plane containing the output shaft and input shaft of the gearbox whereby the output shafts of said first part are substantially symmetrically disposed relative to said second vertical plane.

2. A device as claimed in claim 1, wherein said first part and the crown wheel of the differential mechanism are mounted in rolling bearings, one of said rolling bearings being inside the crown wheel and substantially in alignment with said pinion.

3. A device as claimed in claim 1, wherein said recess has a large bore and a small bore eccentric relative to the large bore and a transverse end face, and the pump has a body having an outer face which is stepped and defines two cylindrical faces which are eccentric with respect to each other, one of said cylindrical faces being larger in diameter than the other cylindrical face and being coaxial with the output shaft of the converter and centered in said large bore of said recess, the other cylindrical face being eccentric relative to said one cylindrical face and defining an end face bearing against said end face of said recess.

4. A device as claimed in claim 3, wherein said end face of the pump body affords an inner seal of the pump and an outer periphery of the pump body affords the centering and outer seal of the pump.

* * * * *